US008468441B2

(12) United States Patent
Cory (10) Patent No.: US 8,468,441 B2
(45) Date of Patent: Jun. 18, 2013

(54) CROSS-APPLICATION SUPPORT OF CHARTS

(75) Inventor: Daniel P. Cory, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 11/227,398

(22) Filed: Sep. 15, 2005

(65) Prior Publication Data

US 2007/0061752 A1  Mar. 15, 2007

(51) Int. Cl.
  *G06F 17/00*  (2006.01)
(52) U.S. Cl.
  USPC .......................................... 715/209; 715/212
(58) Field of Classification Search
  USPC .......... 715/513, 526, 764, 835, 209; 345/747; 717/136
  See application file for complete search history.

(56) References Cited

U.S. PATENT DOCUMENTS

| 5,079,695 | A | 1/1992 | Dysart et al. | 719/316 |
| 5,613,058 | A | 3/1997 | Koppolu et al. | 715/744 |
| 5,619,631 | A | 4/1997 | Schott | 345/440 |
| 5,664,208 | A | 9/1997 | Pavley et al. | 715/209 |
| 6,249,283 | B1 * | 6/2001 | Ur | 715/764 |
| 6,407,761 | B1 * | 6/2002 | Ching et al. | 715/835 |
| 6,446,135 | B1 | 9/2002 | Koppolu et al. | 719/313 |
| 6,556,220 | B1 * | 4/2003 | Hammond | 715/764 |
| 6,701,485 | B1 | 3/2004 | Igra et al. | 715/210 |
| 6,772,413 | B2 * | 8/2004 | Kuznetsov | 717/136 |
| 2001/0042045 | A1 * | 11/2001 | Howard et al. | 705/51 |
| 2003/0149708 | A1 * | 8/2003 | Tsao | 707/104.1 |
| 2003/0174165 | A1 * | 9/2003 | Barney | 345/747 |
| 2004/0039995 | A1 * | 2/2004 | Kuwata et al. | 715/530 |
| 2004/0073872 | A1 * | 4/2004 | Yalovsky et al. | 715/517 |
| 2004/0123242 | A1 * | 6/2004 | McKibben et al. | 715/513 |
| 2004/0243938 | A1 * | 12/2004 | Weise et al. | 715/526 |
| 2005/0044496 | A1 | 2/2005 | Kotler et al. | 715/225 |

(Continued)

FOREIGN PATENT DOCUMENTS

| EP | 00215203 | 6/1988 |
| EP | 1077405 | 2/2001 |
| EP | 1542133 | 6/2005 |
| KR | 10-1997-0007758 | 5/1997 |

OTHER PUBLICATIONS

Johnson, Steve. "Excerpts from MS Word 2003 Step by Step". Copyright: Oct. 20, 2003.*

(Continued)

*Primary Examiner* — Doug Hutton, Jr.
*Assistant Examiner* — Soumya Dasgupta
(74) *Attorney, Agent, or Firm* — Merchant & Gould (57) ABSTRACT

A chart is copied from a first application and pasted to a second application. A determination is made for which copy and paste option is selected for the chart. The chart is communicated to the second application using a clipboard application when the copy and paste operation corresponds to providing a link for the chart that is arranged communicating updated data of the chart. The chart is also communicated to the second application using a clipboard application when the copy and paste operation corresponds to representing the chart as a picture of assembled shapes. The chart is communicated to the second application using a separate data transfer interface when the copy and paste operation corresponds to embedding the chart in the second application. Furthermore, the formatting of the chart may be selected according to source formatting or destination formatting depending on the type of copy and paste operation selected.

20 Claims, 5 Drawing Sheets

U.S. PATENT DOCUMENTS

| | | | | |
|---|---|---|---|---|
| 2005/0289446 | A1* | 12/2005 | Moncsko et al. | 715/501.1 |
| 2006/0064632 | A1 | 3/2006 | Vignet | 715/502 |
| 2006/0284892 | A1* | 12/2006 | Sheridan | 345/661 |
| 2007/0061751 | A1 | 3/2007 | Cory | 715/804 |
| 2008/0177994 | A1* | 7/2008 | Mayer | 713/2 |
| 2008/0222734 | A1* | 9/2008 | Redlich et al. | 726/26 |
| 2010/0070542 | A1* | 3/2010 | Feinsmith | 707/812 |

OTHER PUBLICATIONS

Killmer, Kimberly A. and George, Nashwa; "*Show-and-Tell in Real Time*" Feb. 2002, Journal of Accountancy; 15 pgs.

Search Report and Written Opinion dated Mar. 4, 2009, in Singapore Pat. Appl. No. 200801273-4.

Office Action dated Nov. 11, 2010, in AU Application No. 2006295278.

Office Action dated Mar. 20, 2008, in U.S. Appl. No. 11/227,044.

Office Action dated Dec. 10, 2008, in U.S. Appl. No. 11/227,044.

Office Action dated Sep. 17, 2009, in U.S. Appl. No. 11/227,044.

Office Action dated Dec. 7, 2010, in U.S. Appl. No. 11/227,044.

Amendment filed Sep. 22, 2008, in U.S. Appl. No. 11/227,044.

Amendment filed Jun. 10, 2009, in U.S. Appl. No. 11/227,044.

Amendment filed Mar. 16, 2010, in U.S. Appl. No. 11/227,044.

Office Action dated Jun. 23, 2011, in CN Pat. Appl. No. 200680033763.X, *w/Translation*.

Office Action dated Aug. 16, 2011, in U.S. Appl. No. 11/227,044.

Office Action dated Aug. 28, 2009, in CN Pat. Appl. No. 200680033763.X, *w/Translation*.

Office Action dated Aug. 20, 2010, in CN Pat. Appl. No. 200680033763.X, *w/Translation*.

European Supplemental Search Report issued Feb. 10, 2011, in EP Pat. Appl. No. 06802783.8.

Office Action dated Mar. 1, 2011, in EP Pat. Appl. No. 06802783.8.

Amendment filed Jun. 6, 2011, in U.S. Appl. No. 11/227,044.

Office Action dated Apr. 2, 2012, in U.S. Appl. No. 11/227,044.

Avantgarde, Ltd., "Technique for Creating an Excel Graph to Create Material or Make a Presentation, a one-level-higher use technique <Using Two Methods for OLE for Different Purposes>," Touch PC, vol. 3, No. 11, p. 94, Mainichi Communications Inc., Japan, Nov. 24, 1998, w/partial translation.

Morihiro Sada, "Introduction to a Personal Computer for Beginners in Their Fifties, Special Practice Lecture 30, Nuts and Bolts of Creating Power Point Presentation Material by Using OLE Functions," OA Business Personal Computing, vol. 16, No. 7, pp. 106-110, Dempa Publications, Inc., Japan, Jul. 1, 1998, w/partial translation.

Office Action dated Nov. 7, 2011, in EP Appl. No. 06 802 783.8.

Office Action dated Aug. 17, 2011, in MX Appl. No. MX/a/2008/003416, w/English Summary.

Office Action dated Jan. 6, 2012, in JP Appl. No. 2008-531159, w/English translation.

Amendment filed Jan. 11, 2012, in U.S. Appl. No. 11/227,044.

Litwin, P., et al.; "Access 2002 Enterprise Developer's Handbook"; Dec. 2002.

Office Action dated Apr. 17, 2012, in MX Appl. No. MX/a/2008/003416, w/English Summary.

Summons to Oral Proceedings dated Oct. 2, 2012, in EP Appl. No. 06 802 783.8.

Office Action dated Oct. 26, 2012, in JP Appl. No. 2008-531159, w/English translation.

Office Action dated Dec. 5, 2012, in U.S. Appl. No. 11/227,044.

Amendment filed Oct. 2, 2012, in U.S. Appl. No. 11/227,044.

Office Action dated Feb. 4, 2013, in KR Appl. No. 10-2008-7006325, w/English translation.

\* cited by examiner

CROSS-APPLICATION SUPPORT OF CHARTS

BACKGROUND

As the number of applications available for performing tasks on a computing device increases, the expectation for a seamless user experience among these applications also increases. When working with objects in one application, there is an expectation that the same object will function equivalently when used in a second application. This is especially true for applications included in the same software suite.

However, since many applications provide their own support for the object, the user experience often varies among these applications. For example, a chart created in a powerful charting application is often not supported equivalently when the user attempts to create the same chart in a presentation (e.g., slideshow) application. With certain objects, the user may be unable to create the object at all.

Certain applications allow objects from one or more of the other applications to be embedded within the documents that the application creates. For example, a table generated by a spreadsheet application may be embedded directly amongst text in a word processor document created by a word processor application. However, the options available for copying and pasting objects vary with the applications and the objects being copied.

For example, one standard for embedding an object in document of another application is referred to as the Object Linking and Embedding (OLE) standard. OLE is a compound document standard developed by the Microsoft® Corporation of Redmond, Wash. OLE enables a developer to create objects with one application and then link or embed them in a second application. Embedded objects retain their original format and links to the application that created them. Accordingly, when the document linked to the object is edited and updated, the object itself is also updated. However, OLE has distinct disadvantages since it often stores the embedded object as an image, creating large files and objects that can't be edited inline. The variety of object support solutions available results in a variety of advantages and disadvantages associated with each solution.

SUMMARY

Aspects of the present invention are generally related to providing cross-application support of charts. In one aspect, a user is provided with selectable options for copying a chart from a spreadsheet document and pasting the chart in other host applications. Some indications are that a large number of charts in presentation applications are first generated in a spreadsheet application. Some users select to first create a chart in the spreadsheet application because the spreadsheet application includes a more robust set of features for creating and editing charts.

One aspect of the present invention alters the relationship between the pasted chart in the host application and the chart in the original spreadsheet. The chart is a native host application object that may be edited and formatted directly inside the host application. There is a connection back to a workbook that includes the spreadsheet. However, the connection back to the workbook is established for obtaining the data in the chart rather than for the chart itself. This link between the chart and chart data may be taken advantage of depending on the chart copy and paste operation selected. One paste operation from the spreadsheet application automatically creates this link for the chart when the chart is pasted to the host application document. Another paste operation pastes a picture of assembled shapes representing the chart to the host application document when selected. Still another paste operation allows user to select to paste a copy of the entire workbook into the host application file.

Another aspect of the present invention allows a selection to be made whether to use the source formatting of the chart or the destination formatting of the chart depending on the type of copy and paste operation selected. In still another aspect, the source or destination formatting may be automatically selected based on the type of file to which the chart is being pasted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
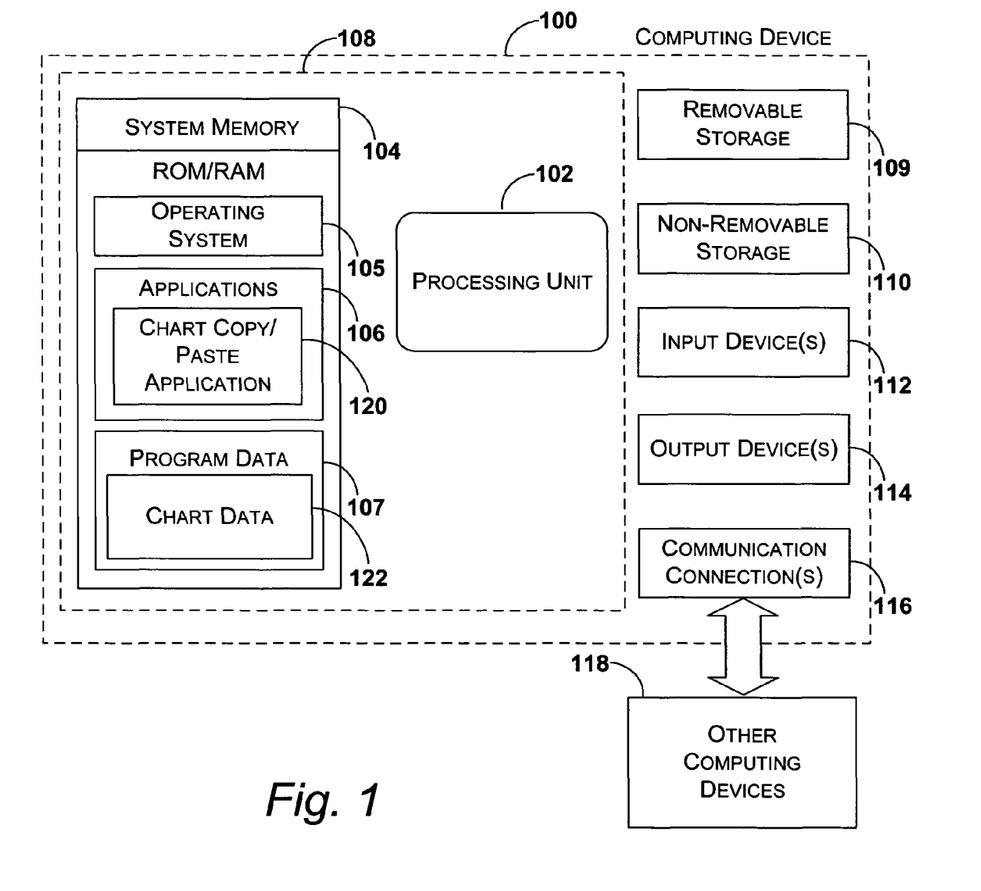
FIG. 1 illustrates an exemplary computing device that may be used in accordance with one exemplary embodiment.

With reference to FIG. 1, one exemplary system for implementing the invention includes a computing device, such as computing device 100. Computing device 100 may be configured as a client, a server, mobile device, or any other computing device. In a very basic embodiment, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a chart copy/paste system 120 for implementing the system of the present invention. Additionally, program data 107 includes chart data 122. This basic embodiment is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

An embodiment executed by computing device 100 provides for a selection of chart copying and pasting operations from one application to another application. For example, one paste operation from the spreadsheet application automatically creates this link for the chart when the chart is pasted to the host application document. Another paste operation pastes a picture of assembled shapes representing the chart to the host application document when selected. Still another paste operation allows user to select to paste a copy of the entire workbook into the host application file.

Advantages of the chart copy and paste operations described herein may be described according to various scenarios. In a first scenario, a user is working with company A as a client and has produced a sophisticated chart that describes the sales of products in company A's stores. Then the user acquires company B as a client. The user opens the company A file that includes chart X and desires to replace the data in chart X with data for company B. The user, according to embodiments described herein, can copy & paste chart X to a company B file and link the chart to the company B data.

In a second scenario, a user has done a detailed analysis of customer survey data and now wants to present it to the team. The user creates a presentation in a presentation application and starts to add content to it. The user also desired to include a previously created chart Z in the presentation. The user is able to select chart Z and copy and paste it into one of the presentation's slides. Once in the slide, the chart matches the design of the presentation automatically. The user may also resize the chart and edit some of the text directly in the presentation.

In a third scenario, a viewer of the presentation desires to make the presentation available for those who missed the presentation. The viewer takes the text of the presentation and compiles it into a word processor document. The view also includes chart Z from the presentation. Chart Z then takes on the theme (colors, fonts, etc.) of the viewer's document. The view can resize the chart and wrap the text neatly around it.

In a fourth scenario, the user desires to send the presentation to clients. However, the user doesn't want them to be able to see the formulas used setting up his spreadsheet where the chart was created. The user creates the chart in a spreadsheet application and copies and pastes into a presentation application. The user selects to paste the chart as a linked chart, which is linked back to the spreadsheet. The user can then send the presentation to the clients without the clients seeing any detailed data. The clients desire to change some of the details of the deal. The user updates the spreadsheet and refreshes the presentation. The chart updates and the user can send the updated presentation to the clients.

In a fifth scenario, the user doesn't trust putting charts into presentations. Previously, the user accidentally sent an embedded file in a presentation to a customer as a result of copying and pasting a chart to the presentation. The client was able to access the embedded file. To ensure information security for future presentations, the user pastes the chart as a collection of shapes rather than as a linked or embedded chart.

Except for a broader meaning that allows the disclosure and claims herein to encompass a wider variety of alternative embodiments, the following terms as used herein and throughout the claims are generally defined as follows:

"Chart" generally refers to a graph, a bar chart, a line chart, a pie chart, tabular chart, or other pictorial depiction of data that may be included in a document. As used herein, there is no limitation on the types of charts that may be included in a particular document.

"Clipboard" or "clipboard application" generally refers to a special file or memory area (e.g., buffer) where data is stored temporarily before being copied to another location. Many word processors, for example, use a clipboard for copying and pasting. When a block of text is copied, the word processor copies the block to the clipboard. When the block is pasted, the word processor copies it from the clipboard to its final destination. The clipboard may be used to copy data from one application to another. In one embodiment the clipboard takes advantage of "delayed rendering". The clipboard, instead of the actual block of text, provides a link to the block of text in the original application and the available formats for the block of text. When the paste command designates a selected format for the block of text, the text is retrieved from the word processor recorded to the clipboard in the selected format. The block is then forwarded to the destination according to the format selected by the paste command.

"Document" is generally defined as any page, sheet, form, or other construction of an application that comprises text, graphical objects, tables, data cells, or other types of data representations. Examples of documents include word processor documents, spreadsheets, charts, slides, web pages, worksheets, notes, e-mail messages, instant messages, drawings, schematics, images, and other arrangements of text and/or graphical objects.

"Feature set" is generally defined as the set of functions or features associated with a particular application. An exemplary feature set of an application supporting chart creation includes sorting functionality, support of formulas, support of chart types, as well as other functions and abilities that provide chart manipulation capabilities.

"Host application" or "destination application" generally refers to an application in which a chart is copied, embedded, or linked. The host application includes a visual representation of the chart within a document of the host application. Host applications may include presentation applications, word processor applications, and other applications that may include a chart.

"Presentation application" generally refers to an application that is configured to provide a presentational display to a user. For example, a slideshow may include one or more slides in a generated presentation. These slides correspond to individual documents produced by the presentation application. An example of a presentation application includes the PowerPoint® software program produced by the Microsoft® Corporation of Redmond, Wash.

"Spreadsheet" is generally defined as a document or database that includes a grid of cells that contain data. One example of a spreadsheet includes a worksheet generated in the Excel® software program produced by the Microsoft® Corporation of Redmond, Wash. Another example of a spreadsheet includes a data grid generated in the Access® software program produced by the Microsoft® Corporation of Redmond, Wash. Each spreadsheet is associated with functionality for producing a chart that corresponds to the data included in the spreadsheet.

"Spreadsheet application" generally refers to an application that is configured to produce a spreadsheet (see "spreadsheet definition above).

Figure 2:
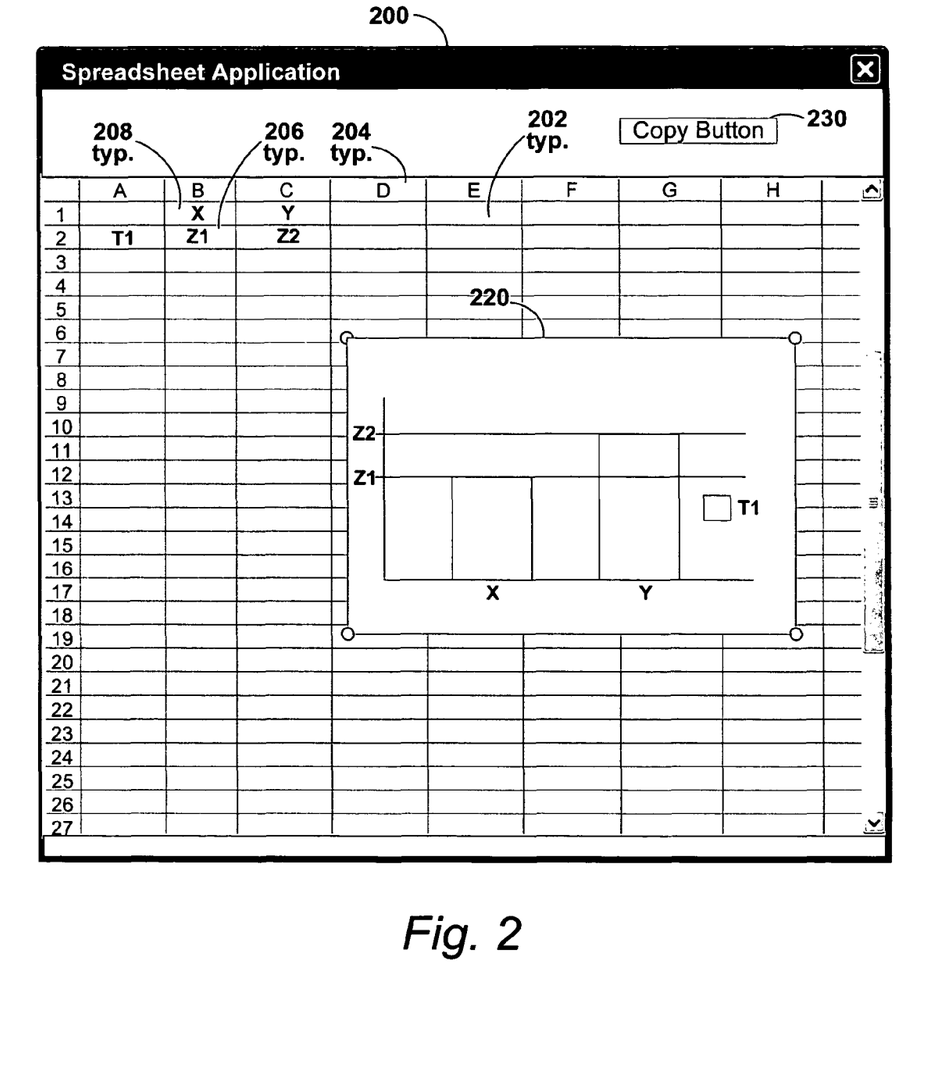
FIG. 2 illustrates an exemplary screenshot of a chart included in a spreadsheet application that is being copied.

FIG. 2 illustrates an exemplary screenshot of a chart included in a spreadsheet application that is being copied in accordance with one embodiment. Spreadsheet application 200 includes an array of cells (e.g., data cell 202). The cells are of various types, including data cells (e.g., data cell 202) and column and row label cells (e.g., column label 204). Within the data cells (e.g., 202) are cells defined by the data they contain. In one example, the data cells included data corresponding to a chart such as chart 220. One type of chart data cell includes a value for the chart (e.g., value cell 206). Another type of data cell associated with a chart includes an axis label that labels an axis or dimension of the chart (e.g., axis label 208). Once chart 220 is created in spreadsheet application 200 by populating the corresponding chart data cells, the chart may be copied. A number of copy functions may be used to copy the chart. In one embodiment, copy button 230 is selected to copy chart 220. Another embodiment copies chart 220 by selecting the chart directly or selecting the area of the chart within the spreadsheet. An exemplary system and method used for copying and pasting a chart are further described below in the discussions of FIGS. 4 and 5.

Although the above-recited embodiment describes copying a chart from a spreadsheet application, the copy of the chart may be made from any type of application including, but not limited to, document editor applications, presentation applications, database access applications, and the like.

Figure 3:
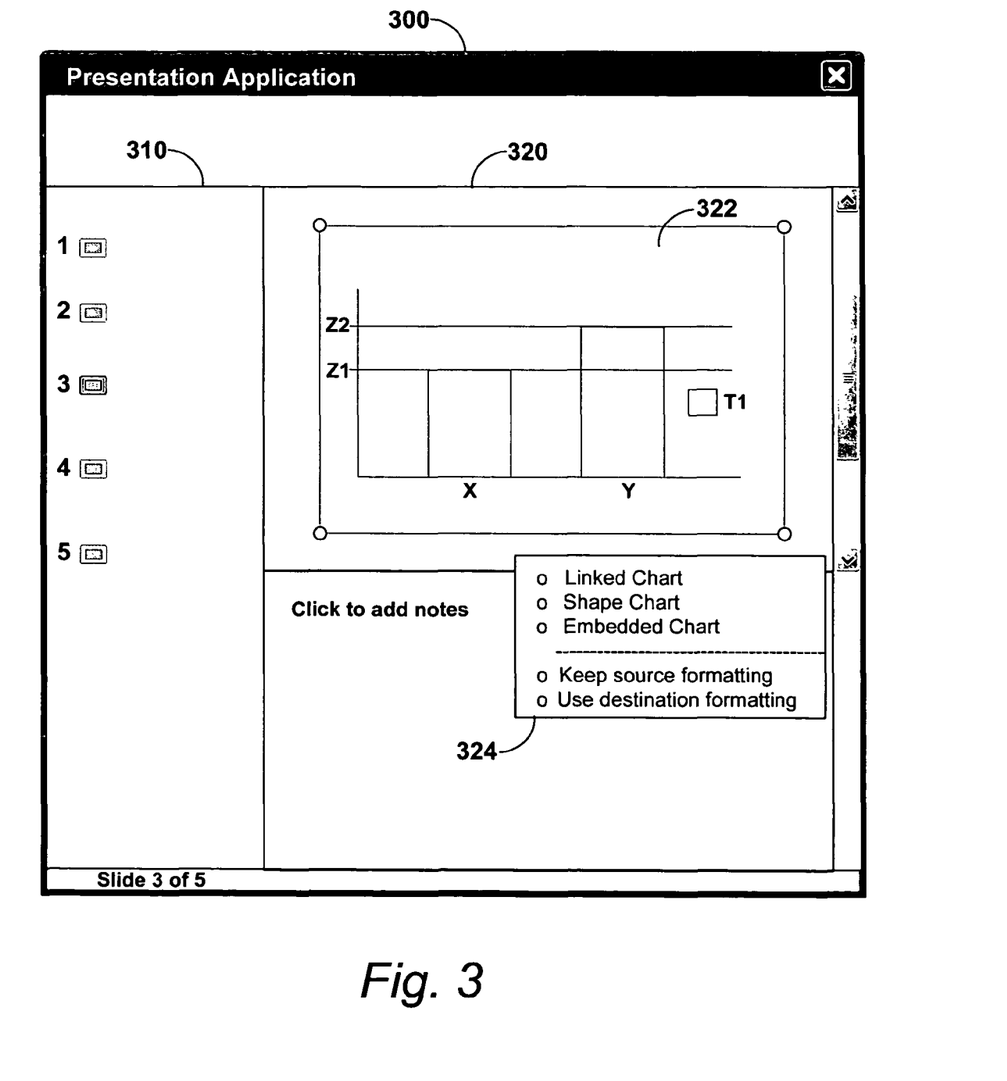
FIG. 3 illustrates an exemplary screenshot of the chart being pasted into a presentation application.

FIG. 3 illustrates an exemplary screenshot of the chart being pasted into a presentation application in accordance with one embodiment. Presentation application 300 includes slide listing field 310 and slide field 320. Slide field 320 also includes chart 322 and chart paste dialog 324. According to the current example, chart 322 corresponds to chart 220 copied from spreadsheet application 200 shown in FIG. 2. It is understood that chart 322 does not appear in slide field 320 until a selection within chart paste dialog 324 is made.

Slide listing field 310 lists the slides available for viewing and editing included in the current presentation file loaded into presentation application 300. Slide listing field 310 also contains a written or visual indication of the slide currently being viewed. A slide listing is common to most presentation applications and is known in the art. Therefore, slide listing field 310 is not discussed in further detail herein.

Slide field 320 includes the content of the slide currently being viewed. In the present example, the slide content includes chart 322 after chart 322 is pasted to slide field 320. Chart 322 is shown as bar chart. However, other types of charts may also be pasted to spreadsheet application 300.

Chart paste dialog 324 includes a number of options for pasting chart 322 to slide field 320. A first option includes selecting to copy chart 322 as a linked chart. A linked chart generally refers to a chart where the data, and possibly the presentation, of the chart are provided across a link to the previous application (e.g., spreadsheet application 200 of FIG. 2) that generated the chart. Integration of the data from the previous application with the chart included in presentation application 300 is further described in the discussion of FIG. 4 below.

A second option includes selecting to paste chart 322 as a picture of assembled shapes. Previously, in order to only paste a picture of the chart, the chart would be reduced to a set of graphic primitives that, when assembled, provided a picture of the chart. A number of problems were associated with this type of representation. For example, a gradient of colors on the chart would be separated into different lines of color according to the limited ability of the graphic primitives. In the embodiments described herein, pasting the chart as a picture instead pastes the picture as assembled shapes. The shapes are described according to an extensible markup language (XML) file format that hierarchically describes shapes. This file format, referred to herein as GVML, corresponds to an XML schema that provides a language for describing a hierarchy of vector shapes. More generally, GVML provides a way of describing a hierarchical set of shapes and text. The hierarchy provided by GVML is organized into nodes and levels. Each node may have associated shape properties that describe how the shapes render. Additionally, each level may have its own set of properties that affect the rendering of a group of shapes. Additionally, the leaf nodes in the hierarchy (leaf nodes refer to the lowest nodes of the hierarchy) may have their own associated property storage structure that provides a list of properties to be applied to a particular shape or a particular block of text. The difference between the GVML representation of the chart and the graphic primitives representation is that GVML recognizes more complex structures, such as gradients. Therefore, GVML provides an editable image of text and shapes that provides for more meaningful interaction with the chart than with the graphic primitives version of the chart.

A third option includes selection to paste chart 322 as an embedded chart included in an entire file. For example, a collection of spreadsheets in a spreadsheet application is often referred to as a "workbook". The workbook refers to the file in which the spreadsheet is located. A workbook may actually comprise one or more spreadsheets. When chart 322 is pasted as an embedded chart, the entire workbook that includes the chart is communicated to the file (e.g., the presentation file of presentation application 300) where the chart is being pasted. When chart 322 is pasted to slide field 320 as a shape chart or linked chart, the shape information and link information is transmitted using a clipboard (see FIG. 4 below). In contrast, copying the entire file including the chart is generally not included in the functionality provided by a clipboard. Therefore, when pasting chart 322 as an embedded chart, an alternate embedded object communication (see FIG. 4 below) is used to transmit the entire file for association with the paste destination.

Although the example of FIG. 3 is directed to a chart in a presentation application that has the chart data provided by a spreadsheet application, it is appreciated that other combinations of applications may be used. The host application need not necessary be a presentation application, but may instead be another host application such as a word processor application or other application in which charts may be included. Additionally, even though the chart data is shown as being provided by a spreadsheet application, the data may be provided by other applications, such as databases applications, grid data applications, or other applications where a chart is generated.

Figure 4:
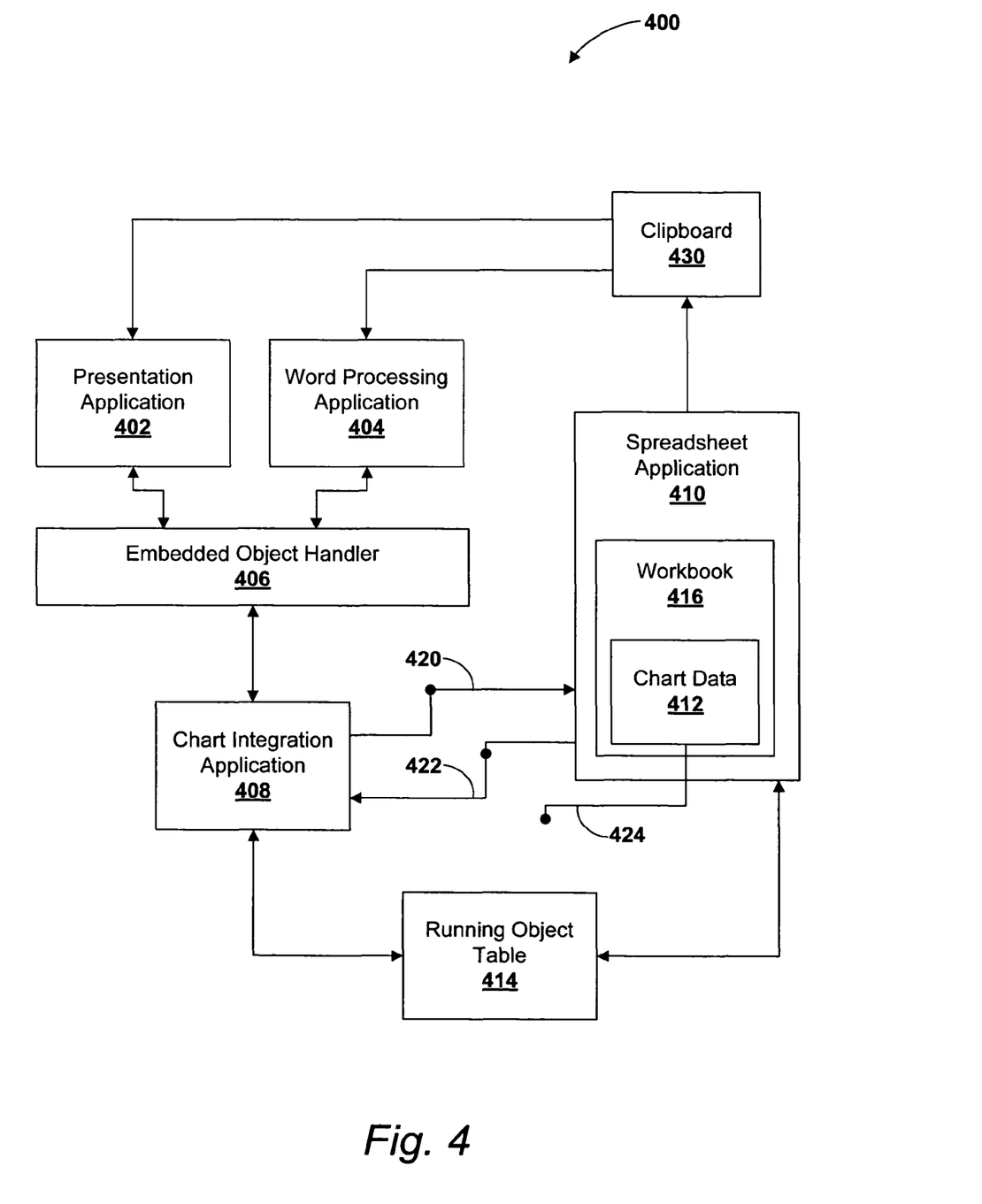
FIG. 4 illustrates a functional diagram of an exemplary system for copying and pasting a chart from a spreadsheet application to a host application.

FIG. 4 illustrates a functional diagram of an exemplary system for copying and pasting a chart from a spreadsheet application to a host application in accordance with one embodiment. System 400 includes presentation application 402, word processing application 404, embedded object handler 406, chart integration application 408, database/spreadsheet application 410, running object table 414, and clipboard 430. Spreadsheet application 410 includes workbook 416 which includes chart data 412 that includes both the presentation data and underlying data of the chart to be copied. When copied, the chart may then be pasted to a host application (402, 404). Although two host applications (402, 404) are shown, any number of host applications may be associated with system 400.

Generally copying the chart from spreadsheet application 410 and pasting it to one of the host applications (402, 404) is facilitated by clipboard 430. Chart data 412 is copied to clipboard 430. Then one or both of the host applications (402, 404) may paste chart data 412 from clipboard 430 to one of their own documents. In one embodiment the clipboard takes advantage of "delayed rendering". The clipboard, instead of the actual block of text, provides a link to the block of text in the original application and the available formats for the block of text. When the paste command designates a selected format for the block of text, the text is retrieved from the word processor recorded to the clipboard in the selected format. The block is then forwarded to the destination according to the format selected by the paste command.

In one embodiment, clipboard 430 is used to provide the link information for a linked chart. When a user selects to have the pasted chart linked to spreadsheet application 410, the link identifies the location of spreadsheet application to the host application. Accordingly, after the chart is pasted, updates to the chart may be made by communicating requests for the updated data through embedded object handler 406 and chart integration application 408.

In another embodiment, clipboard 430 is used to provide the GVML representation of the chart when a shape chart is selected to be pasted. The GVML representation provides an alternate representation of the chart that reduces the chart to an assembled set of shapes and text. The GVML representation allows the chart to be severed from its data source for security purposes, and also provides for legacy support when a host application (402, 404) does not include the functionality for linking or embedding the chart according to system 400.

In still another embodiment, a paste selection may be made for an embedded chart. In this particular embodiment, an embedded chart requires that the entire spreadsheet file or workbook (e.g., 416) associated with chart data 412 be copied, transmitted, and locally stored in association with the host application (402, 404) where the chart is pasted. In this embodiment, clipboard 430 does not include functionality for copying workbook 416 which may comprise multiple pages or spreadsheets. Selecting to paste an embedded chart instead initiates code that copies the workbook to the host application using the alternate data transfer interface provided through embedded object handler 406 and chart integration application 408.

Embedded object handler 406 provides the functionality for supporting objects included in host application documents that are associated with other programs. In one embodiment, embedded object handler 406 corresponds to a graphics program that provides code for integrating graphics objects within host application documents. Embedded object handler 406 provides the interface between chart integration application 408 and the host applications (402, 404). Embedded object handler 406 translates the instructions provided by chart integration application 408 into instructions understood by the host applications (402, 404) for manipulating the graphics objects. In another embodiment, embedded object handler 406 is not included in system 400, and instead, the functionality of embedded object handler 406 is provided by chart integration application 408.

Chart integration application 408 communicates with spreadsheet application 410 to obtain and edit chart data 412 in response to updates or obtain and transfer workbook 416. Chart integration application 408 is configured to supply workbook 416 to the host application (402, 404) in response to selection of the embedded chart paste option. Chart integration application 408 is also configured to synchronize chart data 412 provided by spreadsheet application 410 with the chart included in the host application (402, 404) when the pasted chart is a linked chart. Spreadsheet application 410 organizes chart data 412, responds to requests from chart integration application 408, and communicates chart data 412 to chart integration application 408 through a set of COM interfaces (420, 422, 424). In one embodiment, a first COM interface enables spreadsheet application 410 to notify chart integration application 408 of updates to chart data 412 and to push those updates to chart integration application 412. In the same embodiment, a second COM interface enables chart integration application 408 to initialize spreadsheet application 410 and forward user actions that affect chart data 412 to spreadsheet application 410. Still another, third COM interface enables chart integration application 408 to obtain an instance of the second COM interface that is associated with the first COM interface. In a related further embodiment, a unique instance of the first COM interface and the second COM interface exists for each chart. As stated, the third COM interface relates the first COM interface to the second COM interface. Chart integration application 408 may obtain the third interface from running object table 414. Spreadsheet application 410 records the third COM interface in running object table 414 when spreadsheet application 410 is instantiated. Running object table 414 provides an operational status of each chart initiated by spreadsheet application 410. Using these COM interfaces, workbook 416 may transferred to the host application (402, 404) when an embedded chart is selected, and chart data 412 may be used to update the pasted chart when a linked chart is selected.

When a chart has multiple paste options as described in association with FIG. 3, delayed rendering may be used to apply the paste options to the pasted chart or the options may be applied by chart integration application 408. In one embodiment, a selection may be made by a user to paste the chart according to the formatting of the chart associated with the source application, or the formatting of the chart associated with the destination application. For example, a chart in spreadsheet application 410 may have a red color scheme, while a document in word processor application 404 has a blue color scheme. When the user selects to paste the chart into the document of word processor application 404, the user may select to use the destination formatting to match the color scheme of the chart to the color scheme of the document. Otherwise, if the user prefers the contrasting color schemes, the user may select to retain the source formatting of the chart.

In another embodiment, the selection may be made automatically based on the type of destination application and the type of data being transmitted. For example, rules may be established to use the destination formatting when a chart is pasted to presentation application 402 and to use the source formatting when the chart is pasted to word processor application 404.

Also the formatting selection may be made based on the formatting selections made with relation to chart data 412. For example, in bar chart 220 shown in FIG. 2, the overall color scheme of the chart may be blue, but the color of the bar labeled "Y" was specifically selected by the author of chart 220 to be red. Presentation application 402 includes a presentation where the color scheme is green. Copying and pasting chart 220 to presentation application 402 changes the color scheme of chart 220 from blue to green except for the color of the bar labeled "Y". Since this bar was specifically selected to be red, the bar remains red when copied. The granular level of applying source and destination formatting is possible due to the alternate communication of chart data provided separate from clipboard 430. The alternate data transfer interface allows the chart presentation data and underlying chart data to be separated, and therefore handled separately.

Figure 5:
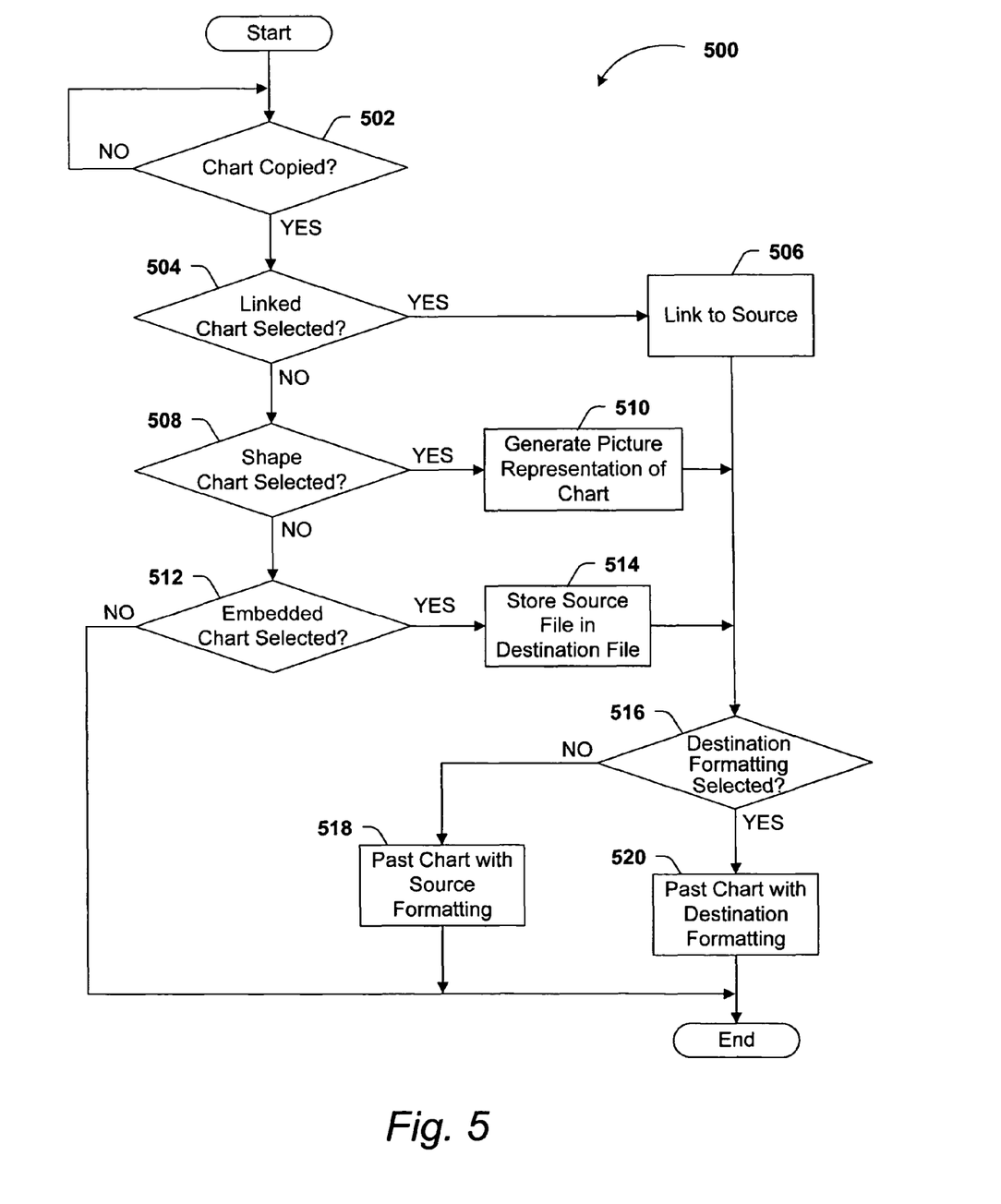
FIG. 5 illustrates a logical flow diagram of an exemplary process for pasting a chart into a host application document, in accordance with one embodiment of the present invention.

FIG. 5 illustrates a logical flow diagram of an exemplary process for pasting a chart into a host application document in accordance with one embodiment. Process 500 starts where a user has selected a chart to be copied and initiates a paste operation of the chart to a host application. Processing continues with copy determination operation 502.

Copy determination operation 502 determines whether the chart has been copied from the application where the chart currently resides. In one embodiment, copy determination operation is responsive to a selection to paste the chart to a host application. It is possible that the chart copy operation did not complete correctly. In another embodiment, the host application checks the clipboard to determine if data corresponding to the chart is contained on the clipboard. If the clipboard does contain chart data, then the chart was copied. If a determination is made that the chart was not successfully copied, processing repeats copy determination operation 502. However, if the chart was copied, processing continues with linked chart determination operation 504.

Linked chart determination operation 504 determines whether the chart is being pasted as a linked chart. If the chart is being pasted as a linked chart, processing moves to link operation 506.

Link operation 506 copies the chart and the link information that identifies the location of the source file to the clipboard, and then provides the chart and link information from the clipboard to the destination file. Accordingly, when updates occur to the chart in the destination file, the updates may be reflected back to the source file according to the link information. Also, changes that occur to the source file may also be reflected in the chart pasted to the destination file. The link utilizes an alternate data transfer interface (see communication through chart integration application 408 in FIG. 4) to update the chart data. In an additional embodiment, link operation 506 establishes the link between the pasted chart and the source file according to the OLE standard instead of through the alternate data transfer interface. The OLE standard is used when the destination application does not include support for the alternate data transfer interface described in FIG. 4. Once the linked chart is pasted to the destination file and the link is established, processing advances to formatting decision operation 516.

In contrast, if the chart is not being pasted as a linked chart according to linked chart determination operation 504, processing continues at shape chart determination operation 508. If the chart is being pasted as a chart that corresponds to a picture of assembled shapes, processing moves to picture generation operation 510.

Picture generation operation 510 generates the GVML representation of the chart and copies the GVML representation to the clipboard. The GVML representation is then provided from the clipboard to the destination file for rendering the chart. Accordingly, since the GVML comprises a graphical description of the chart shapes and text, the connections between the pasted chart and the source file are severed. The severing of the connection allows for better security. Also, since the GVML representation is graphical, the GVML may be provided to legacy versions of the destination applications that do not currently support data transmitted from the source application through alternate data transfer interfaces. Once the shape based chart is pasted to the destination file and rendered, processing advances to formatting decision operation 516.

In contrast, if the chart is not being pasted as a shape chart according to shape chart determination operation 508, processing continues with embedded chart determination operation 512. If the chart is not being pasted as an embedded chart, process 500 ends since the chart is not being pasted as a linked chart, a shape chart, or an embedded chart, and processing moves to other operations for pasting the chart or handling the chart data. If the chart is being pasted as an embedded chart or otherwise as a chart that also includes the source file of the chart, processing moves to source file storage operation 514.

Source file storage operation 514 diverts from using the clipboard for actually passing information of the source file and chart to the destination application and instead uses an alternate communication to transmit the source file including the chart. In one embodiment, the alternate communication corresponds to the communication through chart integration application 408 illustrated in FIG. 4. After the source file containing the copied chart is transmitted to the destination application, the source file is stored in associated with the destination file. Once the source file is stored in association with the destination file, processing advances to formatting decision operation 516.

Formatting decision operation 516 determines the type of formatting selected for the chart. As stated above, a selection may be made by a user or automatically to paste the chart according to source formatting, or destination formatting. In the embodiment shown in FIG. 5, source formatting is treated as the default option for formatting the pasted chart. Therefore, if destination formatting is not selected, processing moves to paste with source formatting operation 518.

Paste with source formatting operation 518 pastes the chart with the formatting that was applied to the chart by the source application. Once the chart is pasted and rendered according to the source formatting, process 500 ends and processing moves to other tasks.

In contrast, if destination formatting is selected at formatting decision operation 516, processing moves to paste with destination formatting operation 520. Paste with destination formatting operation 520 pastes the chart with the formatting that corresponds to the formatting of the file generated by the destination application. Once the chart is pasted and rendered according to the destination formatting, process 500 ends and processing moves to other tasks.

In one additional embodiment, the formatting applied to the pasted chart is more granular, with source formatting applied to selected data in the chart, while destination formatting is applied to the remaining data.

In another additional embodiment, process 500 does not include embedded chart determination operation 512 since process 500 is occurring in association with a legacy version of the destination application. The legacy version does not support data transmitted from the source application through alternate data transfer interfaces as described in the discussion of FIG. 4 above. Since this type of communication is not supported, the option of an embedded chart is not supplied as option for selection when pasting the chart in this instance.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for copying and pasting a chart from a first application to a second application, the method comprising:
    determining when a chart is copied from a first application;
    determining when a copy and paste operation is selected within a second application to copy the chart to the second application, wherein the second application is a host application that includes a visual representation of the chart within a document of the host application after the chart is copied;
    determining when to paste the chart using a source formatting associated with the first application and when to paste the chart using a destination formatting associated with the second application;
    communicating the chart to the second application from the first application using a clipboard application when the copy and paste operation corresponds to one of pasting the chart as a linked chart and pasting the chart as a shape chart, wherein the linked chart corresponds to providing a link to data for the chart between the first and the second application wherein the link automatically communicates updated data of the chart from the first application to the second application, and the shape chart corresponds to representing the chart as a picture of assembled shapes that remains editable and is defined by a hierarchy of vector shapes that follows a schema, wherein the clipboard application temporarily stores data relating to the chart after the copy operation and during the paste operation; and
    communicating the chart to the second application using an alternate data transfer interface when the copy and paste operation corresponds to pasting the chart as an embedded chart, wherein the embedded chart corresponds to providing a file that includes the chart to the second application and the file is associated with the first application.

2. The computer-implemented method of claim 1, further comprising providing an option to paste the chart to the second application according to destination formatting associated with the second application when the copy and paste operation corresponds to one of pasting the chart as the linked chart and pasting the chart as the embedded chart.

3. The computer-implemented method of claim 2, wherein the chart is pasted into the second application according to source formatting associated with the first application when destination formatting is not selected.

4. The computer-implemented method of claim 2, further comprising providing another option to paste the chart to the second application according to source formatting associated with the first application when the copy and paste operation corresponds to one of pasting the chart as the linked chart, pasting the chart as the shape chart, and pasting the chart as the embedded chart.

5. The computer-implemented method of claim 1, further comprising automatically pasting the chart to the second application according to one of destination formatting and source formatting depending on an application type associated with the second application.

6. The computer-implemented method of claim 1, further comprising automatically pasting the chart to the second application according to a combination of destination formatting and source formatting depending on whether at least one object in the chart is specifically set to a particular format when the object is generated in the first application.

7. The computer-implemented method of claim 1, wherein pasting the chart as a linked chart further comprises passing an identifier to the second application, wherein the identifier identifies the location and link information of the first application.

8. The computer-implemented method of claim 1, wherein the alternate data transfer interface corresponds to at least one Component Object Model (COM) interface for implementing communication between applications.

9. The computer-implemented method of claim 1, wherein pasting the chart as a shape chart further comprises passing a hierarchical extensible markup language description of the chart to the second application, wherein the hierarchical extensible markup language description describes the chart according to a set of shapes and text.

10. The computer-implemented method of claim 9, wherein pasting the chart as a shape separates the pasted chart from having a relationship with the first application.

11. The computer-implemented method of claim 1, further comprising communicating changes that occur to the chart when the chart is pasted as the linked chart and communicating the file when the chart is pasted as the embedded chart includes handling the communication according to a chart integration application.

12. The computer-implemented method of claim 1, further comprising providing a dialog associated with the second application for determining whether to paste the chart as one of the linked chart, the shape chart, and the embedded chart.

13. The computer-implemented method of claim 12, wherein the dialog further includes options for pasting the chart to the second application according to destination formatting and pasting the chart according to source formatting.

14. A computer-readable storage medium, excluding a signal, having stored thereon instructions that when executed implements the computer-implemented method of claim 1.

15. A system, comprising:
a processor and a memory;
a source application, wherein the source application includes a chart that is copied;
a destination application, wherein the destination application includes functionality for: pasting the copied chart in response to a selection of a paste operation and receiving a selection of pasting the chart using a source formatting associated with the source application and receiving a selection of pasting the chart using a destination formatting associated with the destination application;
a clipboard that is arranged to temporarily store a representation of the copied chart in the memory after the chart is copied and provide the representation to the destination application in response to a selection being made in the destination application to paste the copied chart as one of a linked chart and a shape chart that when pasted remains editable and is defined by a hierarchy of vector shapes that follows a schema, wherein the linked chart corresponds to providing a link to data for the chart between the source application and the destination application wherein the link communicates updated data of the chart from the source application to the destination application; and
an alternate data transfer interface that is arranged to transfer a file associated with the source application to the destination application when a selection is made in the destination application to paste the copied chart as an embedded chart.

16. The system of claim 15, wherein the functionality for pasting the copied chart further comprises options for pasting the chart to the second application according to destination formatting and pasting the chart according to source formatting.

17. The system of claim 15, wherein the alternate data transfer interface is further arranged to transfer updates to the chart between the source application and the destination application when the copied chart is pasted as a linked chart.

18. The system of claim 15, wherein the functionality for pasting the copied chart further comprises functionality for automatically pasting the chart to the destination application according to a combination of destination formatting and source formatting depending on whether at least one object in the copied chart is specifically set to a particular format when the object is generated in the source application.

19. A computer-readable medium, excluding a signal, having stored thereon instructions that when executed implements the system of claim 15.

20. A computer-readable medium, excluding a signal, having stored thereon computer-executable instructions for copying and pasting a chart from a source application to a destination application, the computer-executable instructions comprising:
communicating the chart to the destination application using a clipboard application when the copy and paste operation selected corresponds to one of pasting the chart as a linked chart and pasting the chart as a shape chart, wherein the linked chart corresponds to providing a link to data for the chart excluding the chart between the source and the destination application; wherein the link communicates updated data of the chart from the source application to the destination application, and the shape chart corresponds to representing the chart as a picture of assembled shapes that remains editable and is defined by a hierarchy of vector shapes that follows a schema, wherein the clipboard application temporarily stores data relating to the chart after the copy operation and during the paste operation;
communicating the chart to the destination application using an alternate data transfer interface when the copy and paste operation selected corresponds to pasting the chart as an embedded chart, wherein the embedded chart corresponds to providing a file that includes the chart to the destination application and the file is associated with the source application; and
displaying options for pasting the chart to the destination application according to destination formatting and pasting the chart according to source formatting, wherein the option for pasting the chart to the destination application according to destination formatting is unavailable when the chart is pasted to the destination application as a shape chart.

* * * * *